(12) United States Patent
Ni et al.

(10) Patent No.: US 6,885,715 B1
(45) Date of Patent: Apr. 26, 2005

(54) METHOD AND APPARATUS FOR SYNCHRONIZING A NETWORK LINK

(75) Inventors: Jie Ni, Beaverton, OR (US); Richard S. Jensen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 09/124,642

(22) Filed: Jul. 29, 1998

(51) Int. Cl.[7] .............................................. H04L 7/00
(52) U.S. Cl. ...................................................... 375/356
(58) Field of Search ................................. 375/356, 357, 375/358, 365, 366, 368; 370/506, 509, 511, 513, 514

(56) References Cited

U.S. PATENT DOCUMENTS

| | | | | |
|---|---|---|---|---|
| 4,807,248 A | * | 2/1989 | Pyatt et al. ..................... | 375/1 |
| 5,259,004 A | * | 11/1993 | Nakayama .................. | 375/106 |
| 5,602,880 A | * | 2/1997 | Webster et al. ............. | 375/371 |
| 6,011,821 A | * | 1/2000 | Sauer et al. ................. | 375/356 |
| 6,081,567 A | * | 6/2000 | Olafson ....................... | 375/354 |

OTHER PUBLICATIONS

F. E. Jordan and C. A. Mead; Synchronous Transmitter–Receiver Clocking Method, IBM Technical Disclosure Bulletin, May 1965.*

*Wevika (NGIO) Architecture: Link Specification*, Intel Server Architecture Laboratory, Enterprise Server Group, Version 0.90 external, Jul. 15, 1998 (preliminary review issue), pp. 1–86.

*Media Access Control (MAC) Parameters, Physical Layer, Repeater and Management Parameters for 1000 Mb/s Operation*, IEEE Draft P802.3z/D5.0, Supplement to Carrier Sense Multiple Access With Collision Detection (CSMA/CD) Access Method & Physical Layer Specifications, LAN MAN Standards Committee of the IEEE Computer Society, May 6, 1998.

* cited by examiner

Primary Examiner—Emmanuel Bayard
(74) Attorney, Agent, or Firm—Blakely, Sokoloff, Taylor & Zafman LLP

(57) ABSTRACT

Briefly, in accordance with one embodiment of the invention, a method of synchronizing two ends of a bi-directional network communication path includes the following. A sequence of predetermined characters are repeatedly transmitted from an end of a bi-directional network communication path if reception is lost at that end. Synchronization or resynchronization occurs from both ends if the sequence of predetermined characters is received at the other end.

4 Claims, 1 Drawing Sheet

METHOD AND APPARATUS FOR SYNCHRONIZING A NETWORK LINK

BACKGROUND

1. Field

The present invention relates to networking, and more particularly, to bi-directionally synchronizing two ends of a network link.

2. Background Information

As is well-known, when forming a network, it is desirable to synchronize the devices across a link. For example, a device at a first end should be synchronized with a device at a second end. Typically, network protocols, such as, for example, IEEE draft P802.3Z/D5.0, available from the IEEE Standards Department, Copyright Information, 445 Hoes Lane, P. O. Box 1331, Piscataway, N.J. 08855-1331, published May 6, 1998, are employed in order to provide this synchronization across a network link. However, network links fail for a variety of reasons. It would be desirable if it were possible to synchronize a network link in a fashion that might provide diagnostics and, in some cases, recovery when communication across the link fails to occur.

SUMMARY

Briefly, in accordance with one embodiment of the invention, a method of synchronizing two ends of a bi-directional network communication path includes the following. A sequence of predetermined characters are repeatedly transmitted from an end of a bi-directional network communication path if reception is lost at that end. Synchronization or resynchronization occurs from both ends if the sequence of predetermined characters is received at the other end.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
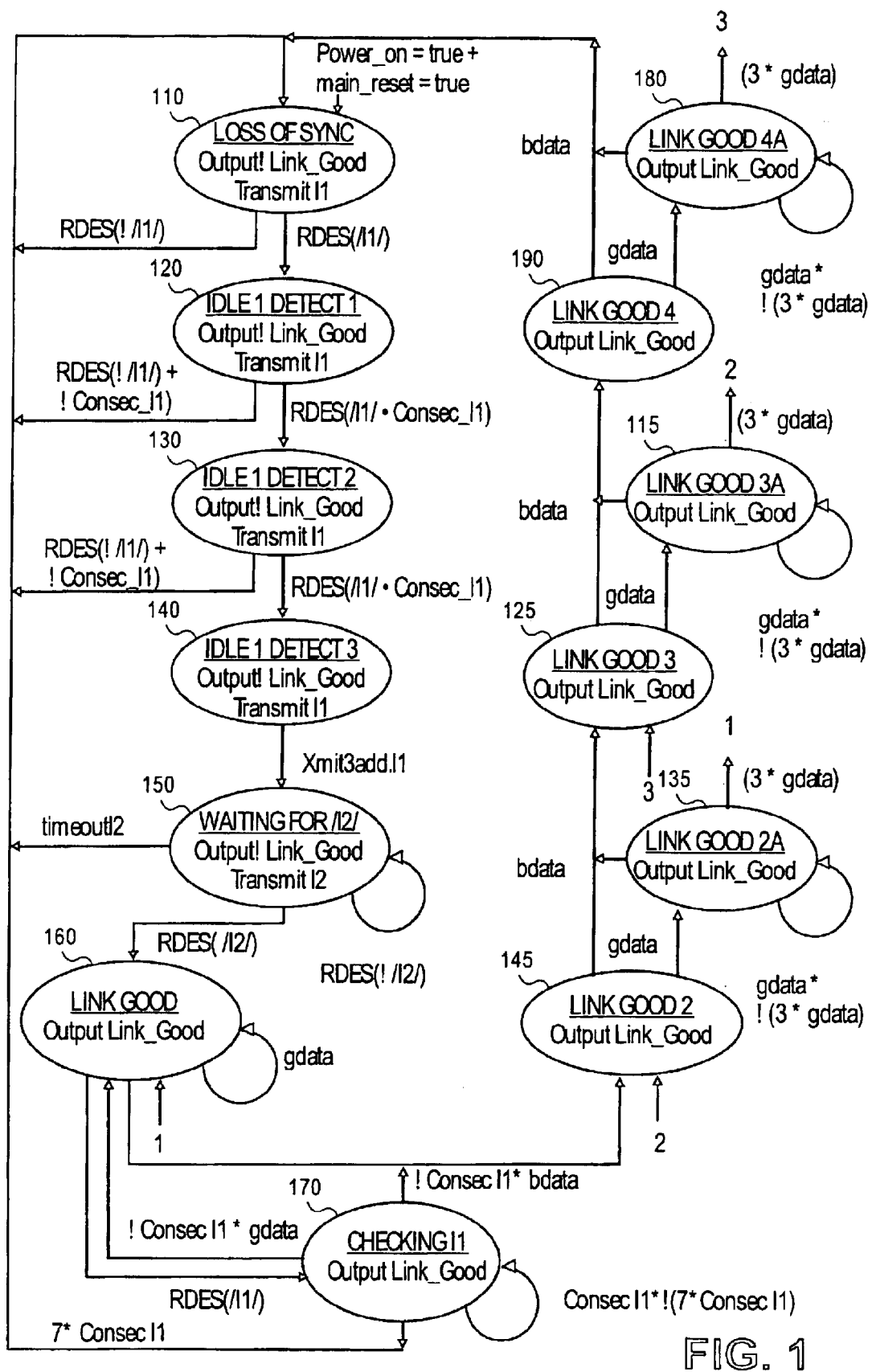
FIG. 1 is a state diagram illustrating an embodiment of a method of synchronizing a network link in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

In this context the term synchronization refers to establishing an electrical link bi-directionally between two points at two ends of a network link, such as coupled by a cable or a wire. Synchronization is employed to ensure that a voltage is successfully transferred bi-directionally from one point or one end to another point or the other end. Once this is established in a network, higher level protocols in the stack may operate to effectuate communication across the network; however, if this synchronization is not established, then the higher level protocols will not function properly. Typically, when synchronization occurs, in addition to recognizing voltage or energy transported across a wire cable or link, also certain patterns are identified bi-directionally by both ends of a full duplexed link. Synchronization, for example, is employed in the IEEE 802.3 specification, published in 1996, (hereinafter referred to as the "ethernet specification") and in the aforementioned IEEE 802.3z specification (hereinafter referred to as the "gigabit ethernet specification"). These specifications are available from the IEEE Standards Department, Copyright Information, 445 Hoes Lane, P. O. Box 1331, Piscataway, N.J. 08855-1331

Typically, although the invention is not limited in scope in this respect, in this embodiment, synchronization is established and then indicated or signaled to an end user, such as by a light emitting diode (LED) or other mechanism on a particular system, at both ends of the link. Such signals are employed as a diagnostic tool to inform the end user whether the link is "up" or the link is "down." One problem, that occurs with systems that comply with the ethernet specification or the gigabit ethernet specification, is that a link up signal may be provided to the end user, although the link may not be properly synchronized, as desired. Therefore, in this respect, an ethernet specification compliant system or gigabit ethernet specification compliant system may not be sufficiently reliable for some situations. For example, in the case of servers employed in a network, due to the size and the potential impact of a server being down, it is desirable to achieve a greater level of reliability than is available using an ethernet or gigabit ethernet specification compliant protocol. In addition, it is desirable in a system providing such additional reliability, that it not be compatible with an ethernet or gigabit ethernet specification compliant protocol, so as not to result in confusion for a system compliant with such an approach, by successfully interacting with a system that employs a protocol complying with the ethernet or gigabit ethernet specification.

In this context, a protocol compliant device may have a transmit process and a receive process implemented in the physical or physical protocol (PHY) layer, although the invention is not limited in scope in this respect. Furthermore, although the invention is not limited in scope in this respect, characters that may be transmitted and received by these processes are defined, for example, in the Wekiva (NGIO) Architecture: Link Specification, version 0.9, dated Jul. 15, 1998, herein incorporated by reference, available from Intel Corp., Santa Clara, Calif., hereinafter referred to as the "NGIO specification," and are compliant with the standard 8B/10B encoding process.

The synchronization detection process for one embodiment in accordance with the present invention is illustrated in FIG. 1. The synchronization process determines whether the link that couples to the receive process is ready for operation. Full synchronization happens on a full duplex link. Therefore, in this particular embodiment, both sides or ends of the link engage in an operation, described in more detail hereinafter, to establish synchronization, substantially at the same time. Partial synchronization occurs between a transmit process and receive process on opposite sides of the link after the synchronization process on the receive process side receives three specific consecutive characters, specified as idle 1 characters for this particular embodiment, as described hereinafter. Of course, the invention is not restricted in scope to these particular characters or to any particular characters.

FIG. 1 illustrates for this embodiment the operations performed by one end of the link, although both ends may be engaging in these operations. As illustrated in FIG. 1, when power is turned on, or reset occurs, indicated for this particular embodiment by the appropriate state variables being true, the synchronization process enters state 110, referred to as the loss of sync (LOS) state in this context. The process will remain in this state until the process receives an idle 1 character. During the LOS state, the transmit process will send idle 1 characters out onto the link. While in the LOS state, the synchronization process waits until it receives an idle 1 character and then moves to the idle 1 detect state, state 120. The output signal of state 110 is "link not good". Therefore, in this particular embodiment, at both ends of the link, under desired operating conditions, a particular system or node is both transmitting and receiving an idle 1 character. It is noted, as previously indicated, that the invention is not limited in scope to the particular character received and transmitted. In this particular embodiment, the aforementioned idle character is the "idle 1" character, as defined in the aforementioned specification, although any character may be employed, whether defined by the aforementioned specification or not.

If the synchronization process receives another consecutive idle 1 character while in state 120, the process moves to state 130. If the synchronization process does not receive a consecutive idle 1 character or receives a different character, the process returns to the loss of sync (LOS) state. In state 120, the transmit process continues to send idle 1 characters. The output signal of this particular state is also a "link not good" signal. If the synchronization process receives yet another consecutive idle 1 character while in state 130, the process enters state 140. If the synchronization process does not receive a consecutive idle 1 character or it receives a different character, the process returns to the LOS state. Again, in state 130, the transmit process continues to send idle 1 characters and the output signal of the state is also link not good. In state 140, the process transmits three additional idle 1 characters. The synchronization process then moves to state 150. The output signal of this state is also link not good. Three consecutive idle 1 characters, as specified in the NGIO specification, for example, are different with respect to the idle characters of the gigabit ethernet specification. Therefore, this particular embodiment is not compatible with the gigabit ethernet specification, although the invention is not limited in scope in this respect. For a system complying with the gigabit ethernet specification to synchronize, after three consecutive idle 1 characters, as defined in the IEEE 802.3z specification, are received, these idle characters being different than those specified in the NGIO specification, the receiver is expected to receive configuration characters that would allow both sides of the link to communicate properly. For this embodiment in accordance with the invention, however, a synchronization process would be waiting for "idle 2" characters, as described hereinafter, which would never occur if coupled by a link to a node complying with the ethernet specification. Therefore, this provides an advantage in that the protocols will not be compatible and lead to the confusion, as previously described, regarding linking two nodes compliant with different protocols.

In state 150, the link is partially synchronized. While in this state, the synchronization process is waiting to receive another character referred to in this context as an "idle 2 character." Again, for this embodiment, this character is defined in the NGIO specification, although the invention is not limited in scope in this respect. The transmit process is transmitting idle 2 characters over the link. One advantage of this approach is that the synchronization process has received good idle 1 characters, as desired, but has not yet confirmed if the receive process at the other end of the link has been receiving the idle 1 characters transmitted across the link by its adjacent or associated transmit process. Therefore, when an idle 2 character is received in the synchronization process, this end of the link has confirmed that its adjacent or accociated transmit process is operating properly. After the synchronization process receives the idle 2 character, the synchronization process moves to state 160. This state 160 indicates that the link is good, as described in more detail below. The output signal of state 150, however, is a link not good signal. If state 150 does not receive an idle 2 character in a predetermined amount of time, the synchronization process enters the loss of sync state.

In state 160, the output signal to the data link is a link good signal. In this particular embodiment, the signal communicates to the data link layer that the link is fully synchronized and flow control characters may be transmitted and received across the link. The synchronization process remains in this state until either nonvalid data is received or an idle 1 character is received. If nonvalid data is received, the synchronization process enters state 145, which continues to test the data received employing multiple sub-stages that effect or accomplish hysteresis to enter the loss of sync state. More specifically, in this embodiment, a sub-process is begun in which the data received is assessed to determine whether the data is good or bad. If sufficient bad data is received, then the loss of sync state is entered, otherwise, if sufficient good data is received, than the link is determined to be good. More specifically, if an idle 1 character is received while in state 160, the synchronization process enters state 170. The output signal of this state is still a link good signal. However, if the synchronization process receives seven consecutive idle 1 characters, it will enter the loss of sync state. If the synchronization process receives nonvalid data in state 170, the process will enter state 145, however, if the process receives good data, but not an idle 1 character, the process moves back to state 160.

As the previous description indicates, in this particular embodiment, if reception is lost at one end of the link, an idle 1 character will be repeatedly transmitted by that end. Of course, the invention is not limited in scope in this respect and any sequence of predetermined characters may be transmitted. This may occur if one end of the link receives bad data and enters state 110, which would begin transmitting the idle 1 character in this embodiment, as previously described. The other end of the link, upon receiving idle characters, would also enter the loss of sync state 110. Therefore, in this case, resynchronization of the link occurs from both ends. If the sequence of predetermined characters is received at the other end, resynchronization of both ends would begin in the manner previously described for synchronization, for this embodiment.

As previously indicated, one advantage of this particular embodiment is as a diagnostic tool. With this embodiment, when one end of the link fails to receive good data, this initiates the diagnostic process that may ultimately result in resynchronization of the link from both ends and also result in signaling to the end user that a loss of synchronization has occurred. In alternative approaches, this signaling, diagnostic, and recovery would not have occurred and, instead, the loss of bad data may result in an error at a higher level protocol and in time consuming and costly diagnostics and investigation of the network to determine the cause.

Many embodiments of an apparatus or system for synchronizing a network link in accordance with the present invention are possible. For example, a network interface unit may be adapted to implement an embodiment of a method for synchronizing a network link in accordance with the invention, such as the embodiment illustrated in FIG. 1. Likewise, a system including a bi-directional communication path including nodes coupled at each end may be similarly adapted to implement such an embodiment.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of synchronizing two ends of a bi-directional network communication path comprising: repeatedly transmitting from an end of the bi-directional communication path a sequence of predetermined characters if reception is lost at that end; and re-synchronizing the link from both ends if the sequence of predetermined characters is received at the other end; wherein resynchronization at an end comprises detecting and transmitting three successive idle 1 characters; and wherein resynchronization at an end further includes detecting and transmitting an idle 2 character.

2. The method of claim 1, and further comprising:
returning to loss of synchronization if an idle 2 character is not detected at an end within a predetermined amount of time.

3. The method of claim 1, and further comprising:
applying a hysteresis sub-process at one of the two ends if nonvalid data is received at that end after resynchronization has occurred at both ends.

4. An apparatus adapted to synchronize two ends of a bi-directional network communication path comprising: a network interface unit adapted to repeatedly transmit from an end of the bi-directional communication path a predetermined character if reception is lost at that end; said network interface unit being further adapted to detect a predetermined set of characters signaling to resynchronize the Link from that end if reception is lost at the other end; wherein said network interface unit is further adapted to detect and transmit another set of predetermined characters after detecting said set of predetermined characters.

* * * * *